United States Patent
Miller et al.

(10) Patent No.: US 7,665,361 B2
(45) Date of Patent: Feb. 23, 2010

(54) METHOD AND APPARATUS FOR CLOSED LOOP OFFSET CANCELLATION

(75) Inventors: Todd F. Miller, Scottsdale, AZ (US); Marco Fuhrmann, Mesa, AZ (US); Keith L. Kraver, Gilbert, AZ (US)

(73) Assignee: Freescale Semiconductor, Inc., Austin, TX (US)

( * ) Notice: Subject to any disclaimer, the term of this patent is extended or adjusted under 35 U.S.C. 154(b) by 162 days.

(21) Appl. No.: 11/626,924

(22) Filed: Jan. 25, 2007

(65) Prior Publication Data

US 2008/0178671 A1    Jul. 31, 2008

(51) Int. Cl.
  *G01P 15/13*    (2006.01)
(52) U.S. Cl. .................................. 73/514.18
(58) Field of Classification Search ............... 73/514.17, 73/514.18, 514.21, 514.22, 514.23, 514.24, 73/514.32, 497
See application file for complete search history.

(56) References Cited

U.S. PATENT DOCUMENTS

| 4,584,885 A | * | 4/1986 | Cadwell .................. 73/862.61 |
| 4,932,261 A | * | 6/1990 | Henrion ................... 73/514.18 |
| 5,454,266 A | * | 10/1995 | Chevroulet et al. ...... 73/514.18 |
| 5,604,309 A | * | 2/1997 | Ward .......................... 73/488 |
| 6,058,783 A | | 5/2000 | Berthold et al. |
| 6,257,061 B1 | * | 7/2001 | Nonoyama et al. ....... 73/514.32 |
| 7,134,338 B2 | * | 11/2006 | Gahn et al. .............. 73/514.18 |
| 7,155,979 B2 | | 1/2007 | Lasalandra et al. |

FOREIGN PATENT DOCUMENTS

JP    05045373 A    2/1993

OTHER PUBLICATIONS

International Search Report and Written Opinion for correlating PCT Patent Application No. PCT/US2008/050348, Applicant's file reference TS10089ZC, dated May 13, 2008.

* cited by examiner

*Primary Examiner*—Helen C. Kwok
(74) *Attorney, Agent, or Firm*—Ingrassia, Fisher & Lorenz, P.C.

(57) ABSTRACT

An apparatus (100, 200) and method (300) for sensing acceleration are provided. The method includes producing (305) a first signal in response to an acceleration sensed by a transducer, producing (310) a second signal based on the first signal, and actuating (315) the transducer in response to the second signal to remove offset in the transducer. The first signal represents the acceleration, and the second signal represents a low frequency component associated with an offset in the transducer. The apparatus (100) includes a transducer (102) producing a capacitance in response to the acceleration, a sensing system (104, 106, 108) producing a first signal from the capacitance representing the acceleration, and a compensation system (112, 110) coupled between the sensing system and transducer. The compensation system produces a second signal based on the first signal for substantially removing an offset of the transducer.

24 Claims, 2 Drawing Sheets

US 7,665,361 B2

METHOD AND APPARATUS FOR CLOSED LOOP OFFSET CANCELLATION

TECHNICAL FIELD

The present invention generally relates to sensing acceleration, and more particularly relates to sensing movement using micro-electro-mechanical systems (MEMS) technology.

BACKGROUND

Accelerometers based on MEMS transducers generally sense movement using a movable central mass that is oriented between fixed beams. For example, a set of beams are coupled to the movable central mass and can be deflected from a rest position by subjecting the system to acceleration. As the beams attached to the central mass move, the distance between these beams and the fixed beam to one side increases by the same amount that the distance to the fixed beam on the other side decreases. This change in distance may be used to measure acceleration.

In many cases, MEMS accelerometers are over-molded to produce a packaged sensor, and this over-molding may impart a stress on the accelerometer. This stress may vary with temperature and time to produce a drift, which has a hysteresis characteristic in the stress behavior of the structure. For example, the profile of this stress can change depending on the environment (e.g., in response to a tester or a particular application) and the time behavior of the properties of the MEMS structure. The stress may result in an offset behavior that is difficult to predict. Offset behavior in the signal chain of the accelerometer can cause asymmetric clipping, resulting in offset shifts at the output of the sensor. In some accelerometers, force feedback is used in an attempt to remove non-linearities and errors from the output signal. While force feedback may be modeled for simple behaviors, to account for feedback loop stability in all conditions, this method becomes complex and is similarly complicated to implement.

Accordingly, a method and apparatus for sensing acceleration having improved accuracy are desired. In addition, a method and apparatus for sensing acceleration having a low implementation complexity and that removes offset shift are desired. Furthermore, other desirable features and characteristics of the present invention will become apparent from the subsequent detailed description of the invention and the appended claims, taken in conjunction with the accompanying drawings and this background of the invention.

BRIEF DESCRIPTION OF THE DRAWINGS

The present invention will hereinafter be described in conjunction with the following drawing figures, wherein like numerals denote like elements.

DETAILED DESCRIPTION

The following detailed description is merely exemplary in nature and is not intended to limit the application and uses of the various embodiments. Furthermore, there is no intention to be bound by any theory presented in the preceding background of the invention or the following detailed description.

According to various embodiments, methods and apparatus are provided for operating a transducer to sense acceleration. Generally, in one embodiment, the transducer has a moveable element oriented between two or more fixed beams. The fixed beams and the moveable element together form back-to-back capacitors (e.g., a first fixed beam and the moveable element forming one capacitor and a second fixed beam and the moveable element forming another capacitor). As the moveable element displaces in response to acceleration, the distances between the moveable element and each of the fixed beams change and the corresponding capacitance values change inversely with the distance between the fixed beam and the moveable element. Thus, the transducer outputs a capacitance that may change based on the acceleration. Other types of transducers that sense acceleration based on the displacement of a moveable element of the transducer may be used.

In an exemplary embodiment, the transducer is coupled to a sensing system and a compensation system. The sensing system produces a signal based on this capacitance representing the acceleration sensed by the transducer. The compensation system acquires a low frequency component from the signal produced by the sensing system, and the low frequency component represents an offset of the moveable element in the transducer due to temperature and/or stress effects. The low frequency component is less than or equal to about 10 Hz and is preferably from about 0.01 Hz to about 10 Hz. The compensation system produces a feedback signal from this low frequency component and supplies the feedback signal to the transducer. In response to the feedback signal, the offset in the moveable element of the transducer is substantially compensated for or eliminated. Offset correction based on the feedback signal may also be applied elsewhere (e.g., the input of a capacitance-to-voltage converter coupled to the output of the transducer).

Figure 1:
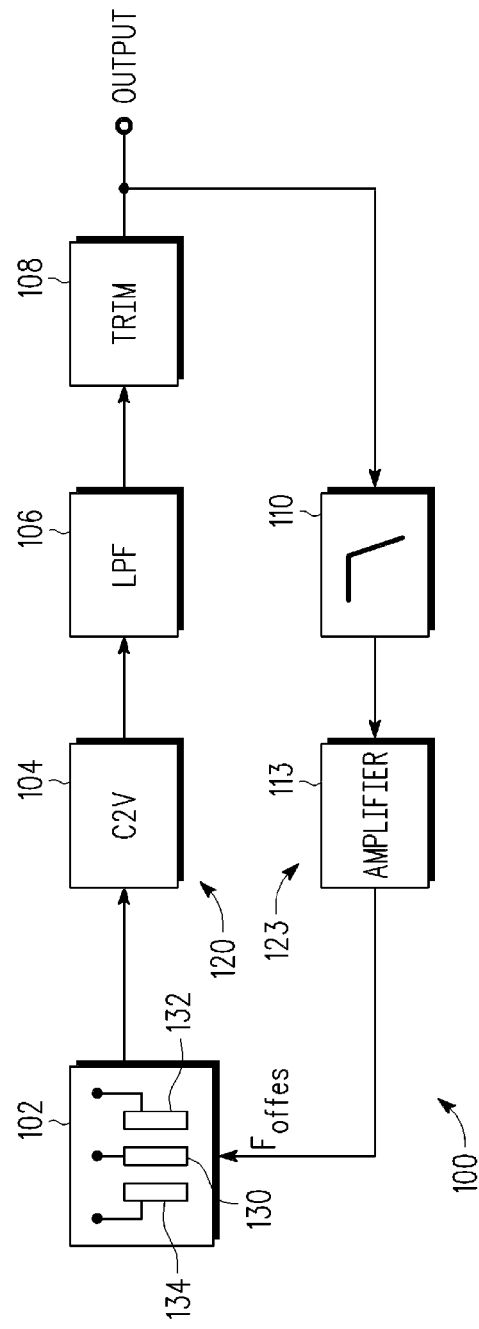
FIG. 1 is a block diagram of a sensing apparatus having a MEMS transducer in accordance with an exemplary embodiment of the present invention.

Referring to the drawings, FIG. 1 is a block diagram of a sensing apparatus 100 including, but not necessarily limited to, a MEMS transducer 102 in accordance with an exemplary embodiment. Sensing apparatus 100 comprises the MEMS transducer (e.g., a g-cell) 102, a capacitance-to-voltage (C2V) converter 104 coupled to an output of transducer 102, a first filter 106 having an input coupled to an output of C2V converter 104, a trim circuit 108 having an input coupled to an output of filter 106, a second filter 110 having an input coupled to an output of trim circuit 108, and an amplifier 113 having an input coupled an output of filter 110 and having an output coupled to an input of transducer 102. C2V converter 104, filter 106, and trim circuit 108 together form a sensing system 120 to produce a signal (e.g., at an output of sensing apparatus 100) representing the acceleration sensed by transducer 102. Filter 110 and amplifier 113 together form a compensation system 123, in a feedback configuration from the sensing system 120 to transducer 102, to produce a signal for removing the offset (e.g., resulting from temperature and stress effects on sensing apparatus 100) that may be present in transducer 102.

In this embodiment, the signal from the compensation system 123 is directly supplied to transducer 102 to substantially eliminate the offset at the source (i.e., transducer 102), and thus substantially compensate for this offset. This improves stability of sensing apparatus 100 over the lifetime thereof by reducing or eliminating drift. Additionally, eliminating the offset at the source of the signal chain (e.g., transducer 102 coupled with sensing system 120 which may be coupled with one or more additional signal processing circuits/devices for various applications) increases the dynamic range of sensing apparatus 100. One or more components of sensing apparatus 100 or corresponding functions may be incorporated together. For example, one or more functions of sensing system 120 and compensation system 123 may be incorporated together in an integrated circuit (e.g., an application specific integrated circuit (ASIC) or the like). In one embodiment, a complementary metal oxide semiconductor (CMOS) ASIC performs the functions of C2V converter 104, filter 106, and trim circuit 108 to measure the capacitance from transducer 102 and signal condition/filter the signal to provide a high level output voltage proportional to the acceleration sensed by transducer 102.

Transducer 102 is preferably a micro-electro-mechanical system (MEMS) type transducer having a moveable element 130 oriented between a pair of fixed beams 132, 134, although other types of transducers may be used, such as nano-electro-mechanical system (NEMS) type transducers or other transducers of varying scales having a moveable element responsive to acceleration. A capacitance is produced by transducer 102 in response to acceleration, and C2V converter 104 detects this capacitance. For example, moveable element 130 displaces in response to acceleration, and thus the distances change between moveable element 130 and fixed beams 132 and 134. As a result, the capacitance values change inversely with the distance between the corresponding fixed beam 132, 134 and moveable element 130. Although the transducer 102 is configured to sense acceleration in two dimensions, the transducer 102 may incorporate additional fixed beams to sense acceleration in three dimensions.

C2V converter 104 may use switched capacitor techniques to measure the capacitance from transducer 102 and extract acceleration data from this capacitance, although other techniques may be used to convert the capacitance from transducer 102 to a voltage. For example, C2V converter 104 may be a switched capacitor circuit, a sigma-delta modulator, or the like, that derives acceleration data from the difference between the capacitance of one fixed beam 132 and moveable element 130 and the other fixed beam 134 and moveable element 130.

In one embodiment, C2V converter 104 outputs a signal having a voltage that is responsive to the capacitance from transducer 102, and the desired acceleration data is filtered from this signal by filter 106. Filter 106 has a frequency range pre-selected to acquire the desired acceleration data (e.g., depending on the application of sensing apparatus 100) while separating this acceleration data from artifact. For example, transducer 102 may be coupled to a vehicle and used to sense the movement of the vehicle. In this example, the acceleration data associated with the vehicle movement will be practically confined to a predetermined range (e.g., about 400 Hz or less) based on the movement capabilities of the vehicle, and a low-pass filter having a corresponding range (e.g., about 400 Hz or less) may be used.

Trim circuit 108 applies a pre-determined correction to the output signal of filter 106. After the manufacturing and assembling process, sensing apparatus 100 may have non-ideal operating characteristics based on intrinsic properties (e.g., offset sources in the read-out circuitry, device mismatch, non-ideal devices, or the like). By testing sensing apparatus 100 under controlled (e.g., non-varying) conditions, after manufacture and assembly, these non-ideal operating characteristics may be determined (e.g., for a 25 C environment), and the correction applied by trim circuit 108 can be selected to account for these non-ideal operation characteristics. For example, an amplifier having non-ideal operating characteristics may contribute undesired gain. In this example, trim circuit 108 can be programmed to substantially remove this gain from the output signal of filter 106. The resulting signal represents the sensed acceleration data which can be used for a variety of applications. For example, a variety of additional circuits or devices may be coupled to the output of sensing apparatus 100 to receive the sensed acceleration data and perform other calculations, monitoring functions, or the like.

In another embodiment, trim circuit 108 is omitted from sensing apparatus 100. Offset sources present in sensing system 120 may produce an initial offset and result in moveable element 130 being non-centered between fixed beams 132 and 134, absent acceleration. During trimming, transducer 102 can be by-passed (e.g., with fixed capacitors), and compensation system 123 can be configured to center moveable element 130 (provided there are negligible differences among the fixed capacitors). The signal representing the sensed acceleration data may be supplied to an analog-to-digital converter (ADC) (not shown), and an offset can be added to or subtracted from an input of the ADC to compensate for the initial offset. In this embodiment, moveable element 130 remains in the non-centered position over temperature variation with compensation system 123 implemented and absent acceleration. Together with the initial offset compensation in the ADC, the ADC produces a symmetric signal over temperature variation.

Under varying temperature and stress, the performance of transducer 102 may dynamically vary, which results in an offset of the moveable element 130 that also varies dynamically. This offset is typically a low frequency occurrence (e.g., about 10 Hz or less). The output signal from trim circuit 108 is filtered through filter 110, which is a digital filter having a range (e.g., from about 10 Hz to about 0.01 Hz) for extracting a low frequency component of the output signal. To filter sub-hertz frequencies any number of algorithms may be used in the implementation of filter 110. The low frequency component represents the offset of moveable element 130 due to temperature and stress effects on transducer 102 and is converted to an analog output (e.g., a voltage) via amplifier 113. Transducer 102 generates an electrostatic force ($F_{o_{ffes}}$) in response to the output of amplifier 113, and the offset (i.e., due to temperature and stress) is substantially eliminated from moveable element 130 in response to the electrostatic force ($F_{o_{ffes}}$). During operation of sensing apparatus 100, moveable element 130 is capable of independently responding to each of the sensed acceleration and the electrostatic force ($F_{o_{ffes}}$) such that the offset may be substantially eliminated during sensing. Thus, the offset, due to temperature and stress, that may be present in the moveable element 130 is substantially compensated for utilizing the compensation system 123.

Figure 2:
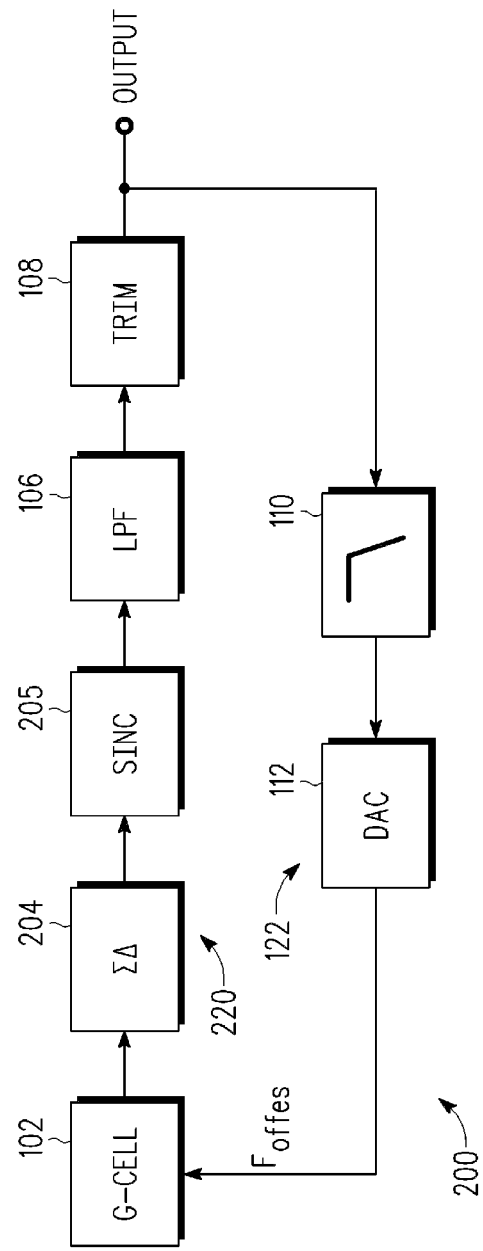
FIG. 2 is a block diagram of a sensing apparatus in accordance with another exemplary embodiment of the present invention.

FIG. 2 is a block diagram of a sensing apparatus 200 in accordance with another exemplary embodiment. Sensing apparatus 200 is functionally similar to sensing apparatus 100 shown in FIG. 1 and replaces C2V converter 104 with a sigma-delta (ΣΔ) converter 204 and a sinc filter 205 to perform a capacitance-to-digital conversion and replaces the amplifier 113 with a digital-to-analog converter (DAC) 112. For example, in addition to transducer 102, filters 106 and 110, and trim circuit 108, shown in FIG. 1, sensing apparatus 200 comprises ΣΔ converter 204 having an input coupled to the output of transducer 102 and sinc filter 205 having an input coupled to an output of converter 204 and having an output coupled to the input of filter 106. ΣΔ converter 204, sinc filter 205, filter 106, and trim circuit 108 together form a sensing system 220 to produce the signal representing the acceleration sensed by transducer 102. Filter 110 and the DAC 112 together form a compensation system 122, in a feedback configuration from the sensing system 220 to transducer 102, to produce a signal for removing the offset (e.g., resulting from temperature and stress effects on sensing apparatus 200) that may be present in transducer 102.

In this embodiment, ΣΔ converter 204 produces a bit stream, although ΣΔ converter 204 does not necessarily have to produce a single-bit stream, in response to the output capacitance of transducer 102, and sinc filter 205 maps the bit stream to a digital value. This digital value is filtered by filter 106 (e.g., to obtain the acceleration data appropriate to the desired acceleration sensing application for sensing apparatus 200) and a pre-determined trim is applied via trim circuit 108 to produce the output signal. Using ΣΔ converter 204 and sinc filter 205 for capacitance-to-digital conversion is one exemplary embodiment, and other devices and methods may be used to perform the capacitance-to-digital conversion. Compensation system 122 produces the voltage that is used by transducer 102 to produce the electrostatic force ($F_{offes}$) for substantially eliminating the offset of moveable element 130 due to temperature and stress. In another embodiment, sinc filter 205 is incorporated with filter 106 into a single filter, such that sinc filter 205 may be omitted.

Figures 3, 4:
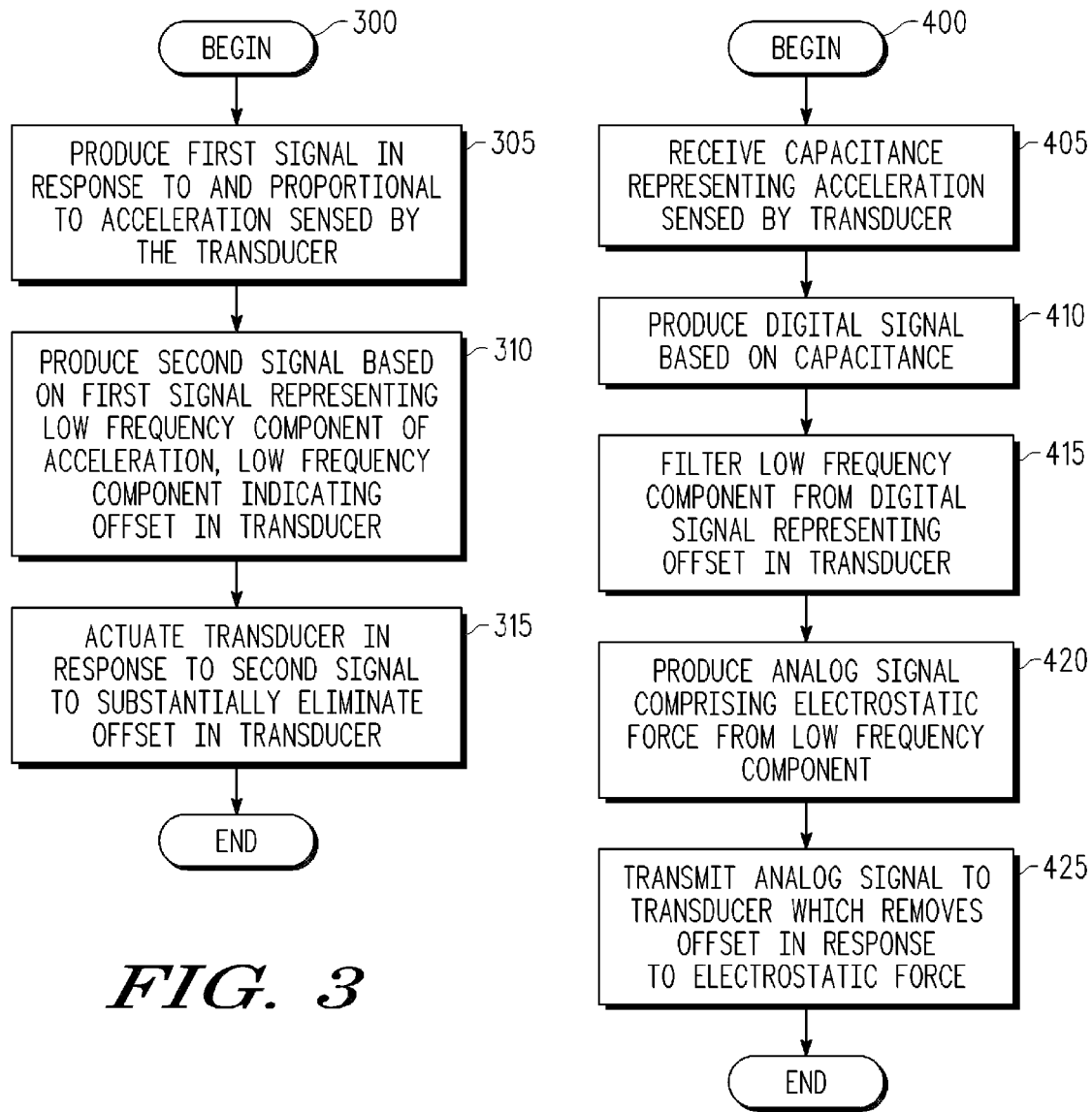
FIG. 3 is a flow diagram of a method for operating a transducer to sense acceleration in accordance with an exemplary embodiment of the present invention.
FIG. 4 is a flow diagram of a method for operating a transducer to sense acceleration in accordance with another exemplary embodiment of the present invention.

FIG. 3 is a flow diagram of a method 300 for operating a transducer, such as transducer 102 shown in FIG. 1, to sense acceleration in accordance with an exemplary embodiment of the present invention. Referring to FIGS. 1 and 3, a first signal is produced in response to the acceleration sensed by the transducer, as indicated at step 305. For example, a displacement of moveable element 130, in response to the acceleration, is sensed by transducer 102, and the first signal is produced in response to this displacement. The first signal is proportional to the acceleration sensed by the transducer. Without acceleration, moveable element 130 has an initial position between fixed beams 132 and 134. Under acceleration, moveable element 130 is displaced (e.g., to a second position between the fixed beams). In one embodiment, a capacitance is produced by transducer 102 in response to the sensed acceleration (e.g., based on the second position of moveable element 130 with respect to fixed beams 132 and 134). An electrical signal is subsequently produced (e.g., a voltage via C2V converter 104 or a digital signal via ΣΔ converter 204 and sinc filter 205) that is responsive to the capacitance. In one embodiment, a bit stream is produced in response to the acceleration sensed by the transducer. In this embodiment, the bit stream is then mapped to a digital value, the digital value is low-pass filtered (e.g., by filter 106 to obtain the acceleration data relevant to the desired application), and a trim is applied (e.g., via trim circuit 108) to the digital value, thereby producing the first signal.

A second signal is produced based on the first signal, as indicated at step 310. The second signal represents a low frequency component of the acceleration sensed by the transducer, and the low frequency component indicates an offset in the transducer that may result from temperature and stress (e.g., from over-molding). In one embodiment, the second signal is filtered through a range of about 0.01 Hz to about 10 Hz to produce the low frequency component. This frequency range may vary depending on the particular application of acceleration sensing. For example, the low frequency component associated with the relevant acceleration data may occur from about twenty percent (20%) to about ten percent (10%), or less, of the maximum frequency (e.g., about 400 Hz) associated with the relevant acceleration data. In another embodiment, the first signal comprises a digital signal, and the low frequency component is filtered from the digital signal (e.g., via filter 110). The low frequency component is converted to the second signal (e.g., a voltage via DAC 112), and an electrostatic force is produced from the second signal (e.g., by transducer 102). The second signal may have higher order terms which may be removed by application of a transform to the voltage and to produce the electrostatic force.

The transducer is actuated in response to the second signal to substantially eliminate the offset in the transducer, as indicated at step 315. In one embodiment, the electrostatic voltage is applied to moveable element 130 of transducer 102, and moveable element 130 is displaced in response to the electrostatic voltage, thereby substantially compensating for the offset of moveable element 130 that may result from temperature and stress (e.g., from over-molding). Ideally, moveable element 130 is substantially centered when in the first position (e.g., without acceleration), although offset sources may be present in the read-out circuitry (e.g., the sensing system 120) that result in moveable element 130 being non-centered in the first position, absent acceleration. These offset sources may also be compensated using the trim circuit 108.

FIG. 4. is a flow diagram of a method 400 for operating a transducer to sense acceleration in accordance with another exemplary embodiment. Referring to FIGS. 2 and 4, a capacitance is received representing an acceleration sensed by the transducer, as indicated at step 405. For example, transducer 102 produces a capacitance in response to acceleration. Based on this capacitance, a digital signal is produced, as indicated at step 410. For example, a first signal (e.g., a voltage) is produced that is responsive to the capacitance and proportional to the acceleration, and the first signal is converted to a digital signal (e.g., via ΣΔ converter 204 with sinc filter 205). The digital signal is then low-pass filtered (e.g., via filter 106) and trimmed (e.g., via trim circuit 108) resulting in a signal having the relevant acceleration data.

A low frequency component is filtered from the digital signal, as indicated at step 415. For example, the digital signal is filtered through a low frequency range from about 0.01 Hz to about 10 Hz, although this low frequency range may vary depending on the particular acceleration sensing application. The low frequency component represents the offset in the transducer that is due to temperature and stress effects on the transducer. An electrostatic force is produced from the low frequency component, as indicated at step 420. For example, the low frequency component is converted to an electrostatic potential (e.g., via DAC 112) which is subsequently converted to the electrostatic force (e.g., by transducer 102). A current source may be used, in place of DAC 112, together with transducer 102 to produce a voltage from the low frequency component.

The offset is substantially compensated for in response to the electrostatic force, as indicated at step 425. For example, the electrostatic force produced by transducer 102 displaces moveable element 130 to substantially eliminate the offset. In one embodiment, moveable element 130 is centered in response to the electrostatic force, absent acceleration, when using trim circuit 108 to compensate for initial offset sources in sensing system 220.

Sensing apparatus 100, 200 can be used in a variety of applications including, but not necessarily limited to, land-based vehicles, aircraft, gyroscopes, positioning systems, portable devices, tracking systems, and entertainment systems. The potential offset, due to temperature and stress, of transducer 102 is determined by analyzing the output signal, representing the relevant acceleration data sensed by transducer 102, for a low-frequency component. An electrostatic force can then be produced that is calibrated to substantially eliminate this offset by direct application to transducer 102. With sensing apparatus 100, 200, the resulting sensed acceleration data has improved accuracy by substantially eliminating offset due to temperature and stress effects on transducer 102. Additionally, the elimination of this offset in sensing apparatus 100, 200 is relatively simple to implement using compensation system 122. By substantially eliminating the offset at the source (i.e., transducer 102), the offset is prevented from propagating to later stages of the signal chain.

A method for operating a transducer to sense acceleration is provided that comprises producing a first signal proportional to the acceleration sensed by the transducer, producing a second signal based on the first signal, and actuating the transducer in response to the second signal to substantially compensate for the offset in the transducer. The second signal represents a low frequency component associated with an offset in the transducer. In one embodiment, producing a first signal comprises producing a capacitance in response to the acceleration sensed by the transducer, producing a voltage responsive to the capacitance, and converting the voltage to a digital signal to produce the first signal. The transducer may comprise a micro-electro-mechanical system (MEMS) device having a moveable element. The method may further comprise sensing a displacement of the moveable element in response to the acceleration, and producing a first signal comprises producing the first signal in response to the displacement. In another embodiment, producing a second signal comprises filtering the first signal through a range of about 0.01 Hz to about 10 Hz to produce the low frequency component of the acceleration sensed by the transducer. The transducer may comprise a moveable element. In this embodiment, actuating the transducer comprises applying an electrostatic voltage to the moveable element of the transducer, and displacing the moveable element of the transducer in response to the electrostatic voltage. The first signal may comprise a digital signal, and producing a second signal may comprise filtering the low frequency component from the digital signal, converting the low frequency component to a voltage, and producing an electrostatic force from the voltage. In another embodiment, producing a second signal comprises filtering the low frequency component from the first signal, converting the low frequency component to a third signal having a voltage, and producing an electrostatic force from the voltage of the third signal. In another embodiment, producing a first signal comprises producing a bit stream in response to the acceleration sensed by the transducer, mapping the bit stream to a digital value, low-pass filtering the digital value, and applying a trim to the digital value. The first signal comprises the digital value.

An apparatus for sensing an acceleration is provided that comprises a transducer having an input and an output, a sensing system having an input coupled to said output of the transducer and having an output, and a compensation system having an input coupled to the output of the sensing system and having an output coupled to the input of the transducer. The transducer is configured to produce a capacitance in response to the acceleration. The sensing system is configured to produce a first signal from the capacitance. The first signal is proportional to the acceleration. The compensation system is configured to produce a second signal based on the first signal and supply the second signal to the transducer. The second signal indicates an offset of the transducer, and the transducer compensates for the offset in response to the second signal. In one embodiment, the sensing system comprises a capacitance-to-voltage converter having an input coupled to the output of the transducer and having an output, and an analog-to-digital converter (ADC) having an input coupled to the output of the capacitance-to-voltage converter and having an output coupled to the input of the compensation system. The capacitance-to-voltage converter is configured to produce a voltage proportional to the acceleration. In another embodiment, the sensing system comprises a modulator having an input coupled to the output of the transducer and having an output, a sinc filter having an input coupled to the output of the modulator and having an output, a first low pass filter (LPF) having an input coupled to the output of the sinc filter and having an output, and a trim circuit having an input coupled to the output of the first LPF and having an output. The modulator is configured to produce a bit stream based on the capacitance. The sinc filter is configured to map the bit stream to a digital value, and the digital value is proportional to the acceleration. In this embodiment, the compensation system comprises a second LPF having an input coupled to the output of the trim circuit and having an output, and a digital-to-analog converter having an input coupled to the output of the second LPF and having an output coupled to the input of the transducer. In another embodiment, the sensing system comprises a switched capacitance converter having an input coupled to the output of the transducer and having an output, a first low pass filter (LPF) having an input coupled to the output of the switched capacitance converter and having an output, a trim circuit having an input coupled to the output of the first LPF and having an output. The switched capacitance converter is configured to convert the capacitance to a voltage. In this embodiment, the compensation system comprises a second LPF having an input coupled to the output of the trim circuit and having an output, and a digital to analog converter having an input coupled to the output of the second LPF and having an output coupled to the input of the transducer. The first signal may have a low frequency component, and the compensation system may be further configured to produce the second signal based on the low frequency component of the first signal. The low frequency component may be less than or equal to about 10 Hz, in one embodiment, and from about 0.01 Hz to about 10 Hz, in another embodiment. The transducer may comprise a micro-electro-mechanical system (MEMS) device having a moveable element configured to displace in response to the acceleration and displace in response to the second signal, independent of the acceleration, to compensate for the offset.

A method for operating a transducer to sense an acceleration is provided that comprises sensing a capacitance representing an acceleration sensed by the transducer, producing a digital signal based on the capacitance, filtering a low frequency component from the digital signal, producing an electrostatic force from the low frequency component, and supplying the electrostatic force to the transducer. The low frequency component represents an offset in the transducer, and the transducer compensates for the offset in response to the electrostatic force. In one embodiment, producing a digital signal comprises producing a voltage responsive to the capacitance, converting the voltage to the digital signal, low-pass filtering the digital signal, and trimming the digital signal. The voltage is proportional to the acceleration. In another embodiment, filtering a low frequency component comprises filtering the digital signal through a range from about 0.01 Hz to about 10 Hz. The transducer may comprise a micro-electro-mechanical system (MEMS) device having a moveable element. The method may further comprise centering the moveable element in response to the electrostatic force. The offset may be due to a temperature effect and a stress effect on the transducer.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A method for operating a transducer having a moveable element that displaces from an initial position to sense acceleration, the method comprising the steps of:
   producing a first signal that is responsive to a capacitance of the transducer;
   applying a first filter to the first signal, wherein the first filter has a frequency range pre-selected to acquire acceleration data, resulting in a filtered first signal;
   producing, based on the filtered first signal, a second signal representing the acceleration sensed by the transducer, wherein the acceleration has a signal frequency within the frequency range of the first filter;
   applying a low-pass filter having a cutoff frequency lower than the signal frequency of the acceleration to the second signal to thereby produce a third signal based on the second signal, wherein the third signal represents a low frequency component having a frequency lower than the signal frequency of the acceleration such that the third signal is associated with an offset of the moveable element of the transducer from the initial position; and
   actuating the transducer with the third signal representing the low-frequency component to thereby apply an electrostatic force that restores the moveable element of the transducer to the initial position in response to an output of the low-pass filter and thereby substantially cancel the offset in the transducer.

2. A method according to claim 1, wherein said step of producing the first signal comprises:
   producing a capacitance in response to the acceleration sensed by the transducer;
   producing a voltage responsive to the capacitance; and
   converting the voltage to a digital signal to produce the first signal.

3. A method according to claim 1, wherein the transducer comprises a micro-electro-mechanical system (MEMS) device having the moveable element, wherein the method further comprises sensing a displacement of the moveable element in response to the acceleration, and wherein said step of producing a first signal comprises producing the first signal in response to the displacement.

4. A method according to claim 1, wherein said applying the low-pass filter step comprises filtering the second signal through a range of about 0.01 Hz to about 10 Hz to produce the low frequency component of the acceleration sensed by the transducer.

5. A method according to claim 1, wherein said step of actuating comprises:
   applying an electrostatic voltage to the moveable element of the transducer; and
   displacing the moveable element of the transducer in response to the electrostatic voltage.

6. A method according to claim 1, wherein the second signal comprises a digital signal, and wherein said step of producing a third signal comprises:
   filtering the low frequency component from the digital signal;
   converting the low frequency component to a voltage; and
   producing an electrostatic force from the voltage.

7. A method according to claim 1, wherein said applying the low-pass filter step comprises:
   filtering the low frequency component from the second signal;
   converting the low frequency component to a fourth signal; and
   producing an electrostatic force from the fourth signal.

8. A method according to claim 1, wherein said step of producing a first signal comprises:
   producing a bit stream in response to the acceleration sensed by the transducer; and
   mapping the bit stream to a digital value,
   the first signal comprising the digital value.

9. An apparatus for sensing an acceleration having a signal frequency, the apparatus comprising:
   a transducer having an input and an output and a moveable element, said transducer configured to produce a capacitance based upon displacement of the moveable element from an initial position in response to the acceleration;
   a sensing system having an input coupled to said output of said transducer and having an output, said sensing system configured to produce a first signal from said capacitance, wherein said first signal is proportional to the acceleration, and said first signal is produced by applying a first filter of the sensing system to a capacitance-responsive signal that is derived from the capacitance, wherein the first filter has a frequency range pre-selected to acquire acceleration data; and
   a compensation system having an input coupled to said output of said sensing system and having an output coupled to said input of said transducer, said compensation system configured to:
      filter the first signal with a low-pass filter having a cutoff frequency lower than the signal frequency of the acceleration to thereby produce a second signal based on said first signal, said second signal being output representing a low-frequency component of the first signal having a frequency lower than the signal frequency of the acceleration and indicating an offset of said transducer; and
   supply the low frequency component that is output from the low-pass filter to the transducer to thereby apply an electrostatic force to restore the moveable element of the transducer to the initial position in response to the output of the low-pass filter and to thereby substantially cancel the offset in the transducer.

10. An apparatus according to claim 9, wherein said sensing system comprises:
    a capacitance-to-voltage converter having an input coupled to said output of said transducer and having an output, said capacitance-to-voltage converter configured to produce a voltage proportional to said acceleration; and
    an analog-to-digital converter (ADC) having an input coupled to said output of said capacitance-to-voltage converter and having an output coupled to said input of said compensation system.

11. An apparatus according to claim 9, wherein said sensing system comprises:

a modulator having an input coupled to said output of said transducer and having an output, said modulator configured to produce a bit stream based on said capacitance;

a sinc filter having an input coupled to said output of said modulator and having an output, said sinc filter configured to map said bit stream to a digital value, said digital value being proportional to said acceleration;

the first filter, which is a first low pass filter (LPF) having an input coupled to said output of said sinc filter and having an output; and a trim circuit having an input coupled to said output of said first LPF and having an output; and said compensation system comprises:

a second LPF having an input coupled to said output of said trim circuit and having an output; and a digital-to-analog converter having an input coupled to said output of said second LPF and having an output coupled to said input of said transducer.

12. An apparatus according to claim 9, wherein said sensing system comprises:

a switched capacitance converter having an input coupled to said output of said transducer and having an output, said switched capacitance converter configured to convert said capacitance to a voltage;

the first filter, which is a first low pass filter (LPF) having an input coupled to said output of said switched capacitance converter and having an output; and a trim circuit having an input coupled to said output of said first LPF and having an output; and said compensation system comprises:

a second LPF having an input coupled to said output of said trim circuit and having an output; and a digital to analog converter having an input coupled to said output of said second LPF and having an output coupled to said input of said transducer.

13. An apparatus according to claim 9, wherein said compensation system is further configured to produce said second signal based on said low frequency component of said first signal.

14. An apparatus according to claim 13, wherein said low frequency component is less than or equal to about 10 Hz.

15. An apparatus according to claim 13, wherein said low frequency component is from about 0.01 Hz to about 10 Hz.

16. An apparatus according to claim 9, wherein the moveable element is responsive to the acceleration and also to said second signal, independent of the acceleration, to compensate for said offset from the initial position.

17. A method for operating a transducer having a moveable element that displaces from an initial position to sense an acceleration, the method comprising:

sensing a capacitance representing an acceleration sensed by the transducer, the acceleration having a signal frequency;

producing a first signal that is responsive to the capacitance;

applying a first filter to the first signal, wherein the first filter has a frequency range pre-selected to acquire acceleration data, resulting in a filtered first signal;

producing, based on the filtered first signal, a second signal representing the acceleration, wherein the acceleration has a signal frequency within the frequency range of the first filter;

applying a low-pass filter having a cutoff frequency below the signal frequency of the acceleration to the second signal to thereby extract a low frequency component from the sensed capacitance, the low frequency component representing an offset of the moveable element from the initial position and having a frequency lower than the signal frequency of the acceleration; and supplying the low frequency component that is output from the low-pass filter to the transducer to thereby apply an electrostatic force to restore the moveable element of the transducer to the initial position in response to the output of the low-pass filter and thereby substantially cancel the offset in the transducer.

18. A method according to claim 17, wherein producing the first signal comprises:

producing a voltage responsive to the capacitance, the voltage proportional to the acceleration; and converting the voltage to a digital signal.

19. A method according to claim 18, wherein said step of applying the low-pass filter comprises filtering the digital signal through a range from about 0.01 Hz to about 10 Hz.

20. A method according to claim 17, wherein the transducer comprises a micro-electro-mechanical system (MEMS) device; and wherein the method further comprises centering the moveable element in response to the electrostatic force.

21. A method according to claim 17, wherein the offset is due to a temperature effect and a stress effect on the transducer.

22. The method of claim 1 wherein the offset is a DC offset from the initial position of the moveable element, wherein the second signal obtained from the low-pass filter represents the DC offset, and wherein the actuating comprises substantially eliminating the DC offset by restoring the moveable element to the initial position in response to the second signal.

23. The apparatus of claim 9 wherein the offset is a DC offset from the initial position of the moveable element, wherein the second signal obtained from the low-pass filter represents the DC offset, and wherein the supplying comprises substantially eliminating the DC offset by restoring the moveable element to the initial position in response to the second signal.

24. The method of claim 17 wherein the offset is a DC offset from the initial position of the moveable element, wherein the second signal obtained from the low-pass filter represents the DC offset, and wherein the supplying comprises substantially eliminating the DC offset by restoring the moveable element to the initial position in response to the second signal.

* * * * *